United States Patent
Lee

(10) Patent No.: US 8,986,908 B2
(45) Date of Patent: Mar. 24, 2015

(54) METHOD OF MANUFACTURING FUEL CELL ANODE

(71) Applicants: Hyundai Motor Company, Seoul (KR); Kia Motors Corporation, Seoul (KR)

(72) Inventor: Hoonhui Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/652,750

(22) Filed: Oct. 16, 2012

(65) Prior Publication Data

US 2014/0011119 A1   Jan. 9, 2014

(30) Foreign Application Priority Data

Jul. 3, 2012   (KR) .................. 10-2012-0072121

(51) Int. Cl.
| | | |
|---|---|---|
| H01M 8/00 | (2006.01) | |
| H01M 4/90 | (2006.01) | |
| H01M 4/36 | (2006.01) | |
| H01M 4/02 | (2006.01) | |
| H01M 4/86 | (2006.01) | |
| H01M 4/88 | (2006.01) | |
| H01M 4/92 | (2006.01) | |
| H01M 8/10 | (2006.01) | |

(52) U.S. Cl.
CPC .......... *H01M 4/9016* (2013.01); *H01M 4/8615* (2013.01); *H01M 4/8657* (2013.01); *H01M 4/8867* (2013.01); *H01M 4/92* (2013.01); *H01M 2008/1095* (2013.01); *Y02E 60/50* (2013.01)

USPC ............ 429/535; 429/528; 429/526; 429/523

(58) Field of Classification Search
None
See application file for complete search history.

(56) References Cited

U.S. PATENT DOCUMENTS

| | | | |
|---|---|---|---|
| 6,936,370 B1 * | 8/2005 | Knights et al. ............... | 429/482 |
| 2006/0008696 A1 | 1/2006 | Cha et al. | |
| 2009/0214927 A1 * | 8/2009 | Dadheech et al. ............ | 429/34 |
| 2011/0165491 A1 | 7/2011 | Shirvanian | |

FOREIGN PATENT DOCUMENTS

| | | |
|---|---|---|
| JP | 10-074523 A | 3/1998 |
| KR | 10-2007-0046084 | 5/2007 |
| KR | 2010-0110245 A | 10/2010 |
| KR | 10-2011-0078573 | 7/2011 |
| KR | 2012-0056848 A | 6/2012 |
| WO | 2006062947 A3 | 12/2006 |

* cited by examiner

*Primary Examiner* — Yoshitoshi Takeuchi
(74) *Attorney, Agent, or Firm* — Mintz Levin Cohn Ferris Glovsky and Popeo, P.C.; Peter F. Corless

(57) ABSTRACT

Disclosed is a method of manufacturing an anode for a fuel cell. The method includes: synthesizing a fuel cell catalyst used to oxidize a fuel for the anode in an electrochemical manner; forming an electrode for the anode by use of the synthesized fuel cell catalyst; and synthesizing an electrolysis catalyst, which is used to electrolyze water, on the electrode as the electrolysis catalyst is loaded into the anode. By introducing the electrolysis catalyst on the fuel cell electrode that has already been formed, deformation of the structure of the electrode is minimized and performance of the electrode is improved.

4 Claims, 4 Drawing Sheets

METHOD OF MANUFACTURING FUEL CELL ANODE

CROSS-REFERENCE TO RELATED APPLICATION

This application claims priority to Korean Patent Application No. 10-2012-0072121 filed on Jul. 3, 2012, which is incorporated herein by reference in its entirety.

BACKGROUND OF THE INVENTION

1. Field of the Invention

The present invention relates to a method of manufacturing a fuel cell electrode, and particularly, to a method of manufacturing a fuel cell anode for a Polymer Electrolyte Membrane Fuel Cell (PEMFC).

2. Description of Related Art

The membrane electrode assembly (MEA) structure of a Polymer Electrolyte Membrane Fuel Cell mainly consists of an anode, a cathode and a proton-conducting polymer electrolyte membrane disposed between the anode and the cathode.

In general, multiple membrane electrode assemblies are stacked up against each other to form a polymer electrolyte membrane fuel cell stack.

Catalysts of the anode and the cathode mainly have the form of homogenous or heterogeneous noble metal nanoparticles uniformly distributed on the surface of a conductive porous support. The noble metal nanoparticles bring the oxidation of fuel and the reduction of oxygen at the anode and the cathode, respectively. The porous support is typically a carbon material.

When driving a fuel cell vehicle with the above fuel cell stack mounted therein, a fuel gas passage in the anode may be blocked by produced water or humidification water resulting in flooding of the fuel cell. In addition, when starting the vehicle in a low temperature condition below the freezing point, any water remaining in the anode is frozen to block the gas passage of the anode.

In this case, if the anode lacks a supply of fuel ($H_2$) due to blockage of the gas passage, the electric potential of the anode is increased, and the fuel cell has a minus value in the total voltage. In other words, a reverse voltage (or potential) phenomenon occurs.

When the fuel cell operates under a reverse voltage condition, the carbon serving as the support gradually or rapidly oxidizes and the electrode structure collapses. This results in degradation in the performance of the fuel cell.

Among various approaches suggested to reduce the constraint associated with the carbon oxidation of the anode, one involves use of a catalyst capable of electrolyzing water added to the fuel cell anode such that electrons are supplied not from the carbon but from the water when the reverse potential occurs. To this end, an oxide catalyst capable of electrolyzing water, for example, ruthenium oxide ($RuO_x$), iridium Oxide ($IrO_x$), a rubidium compound, an iridium compound, iridium metal and the like, is synthesized, and then the oxide catalyst is mixed with a general anode catalyst, thereby forming the electrode.

However, the water electrolysis catalyst operates through a solvent-based reduction/oxidation, so the process is complicated and manufacture of the catalyst is a lengthy process. In addition, the conventional manufacturing method for forming such a catalyst causes a difficulty in implementing a desired MEA electrode structure. This is due to the water splitting catalyst which, due to its own physical/chemical properties such as affinity and suitability for the solvent, exerts an influence on the porous structure of the electrode and the dispersion of ionomer.

SUMMARY OF THE INVENTION

The present invention is directed to a method of manufacturing a fuel cell anode, particularly a fuel cell anode for a Polymer Electrolyte Membrane Fuel Cell (PEMFC). Method of the present invention are capable of minimizing the deformation of an MEA (Membrane Electrode Assembly) electrode structure when introducing a water electrolysis catalysis, particularly by providing a simplified process for introducing the water electrolysis catalyst.

In accordance with an embodiment of the present invention, a method of manufacturing an anode for a fuel cell includes: synthesizing a fuel cell catalyst for the anode in an electrochemical manner; forming an electrode for the anode by use of the synthesized fuel cell catalyst; and synthesizing an electrolysis catalyst, which is used to electrolyze water, on the electrode. According to preferred embodiments, the electrolysis catalyst is synthesized on the electrode at the same time of loading the electrolysis catalyst (for example, while the electrolysis catalyst is loaded or inserted into the anode).

According to various embodiments, the fuel cell is a polymer electrolyte fuel cell.

The fuel cell catalyst can be selected from any conventional fuel cell catalysts. According to various embodiments, the fuel cell catalyst is selected from the group consisting of noble metals, transition metals, oxides of noble metals and transition metals, alloys of noble metals and transition metals, and mixtures thereof. The electrolysis catalyst can be selected from any conventional electrolysis catalysts. According to various embodiments, the electrolysis catalyst is selected from the group consisting of noble metal oxides, mixtures of noble metal oxides, solid solutions of noble metal oxides, mixtures of noble metal oxides and valve metal oxides (wherein valve metals are generally understood to refer to those metals that pass current in only one direction, e.g. Ti, Zr, Hf, V, Nb, Ta, etc.), solid solutions of noble metal oxides and valve metal oxides, and mixtures thereof.

According to various embodiments, the electrolysis catalyst is selected from the group consisting of ruthenium oxide ($RuO_x$), iridium oxide ($IrO_x$), a solid solution of ruthenium oxide ($RuO_x$) and iridium oxide ($IrO_x$), and mixtures thereof.

According to an exemplary embodiment, the electrolysis catalyst is selected from the group consisting of a solid solution of ruthenium oxide ($RuO_x$) and valve metal oxide, and a solid solution of iridium oxide ($IrO_x$) and valve metal oxide.

According to various embodiments, the electrolysis catalyst includes a solid solution of ruthenium oxide ($RuO_2$) and titanium oxide ($TiO_2$).

The synthesizing of the electrolysis catalyst may be performed by any conventional techniques. According to various embodiments, the synthesizing is performed by a thin film deposition technique, such as an Atomic Layer Deposition (ALD) technique.

Other objects and advantages of the present invention can be understood by the following description, and will become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

Figure 1:
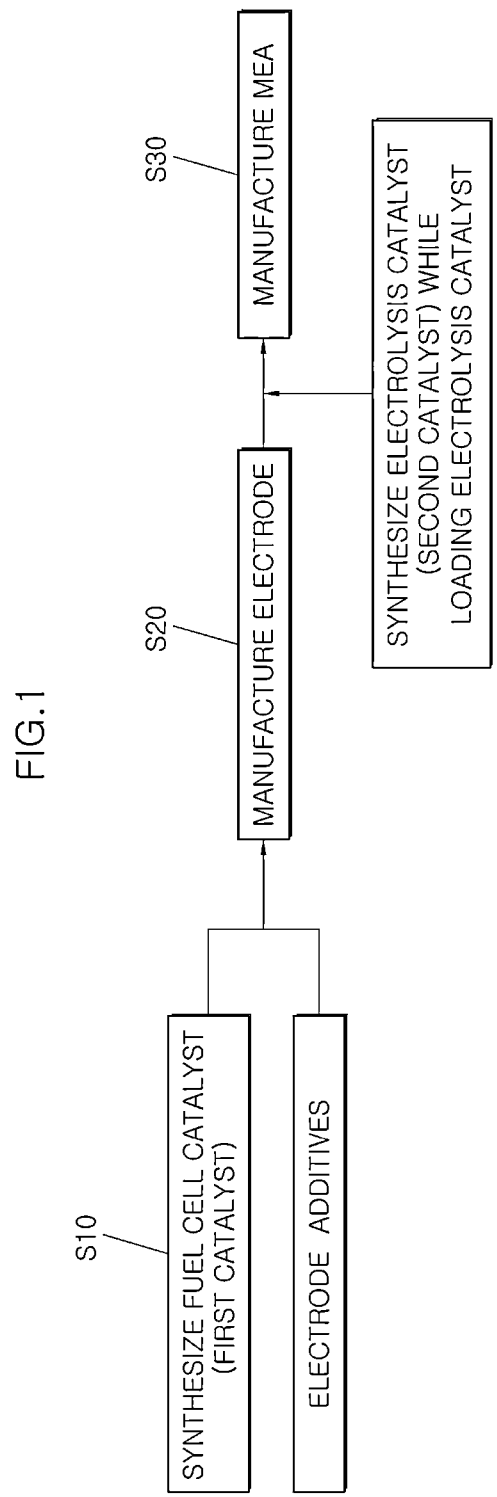
FIG. 1 is a block diagram illustrating a method of manufacturing a fuel cell anode in accordance with an embodiment of the present invention.

Exemplary embodiments of the present invention will be described below in greater detail with reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof. As used herein, the term "and/or" includes any and all combinations of one or more of the associated listed items.

The drawings are not necessarily to scale, and in some instances, proportions may have been exaggerated in order to clearly illustrate features of the embodiments. When a first layer is referred to as being "on" a second layer or "on" a substrate, it not only refers to the case where the first layer is formed directly on the second layer or the substrate, but also the case where a third layer exists between the first layer and the second layer or the substrate.

Hereinafter, a method of manufacturing a fuel cell anode in accordance with an embodiment of the present invention will be described with reference to the accompanying drawings.

FIG. 1 is a block diagram illustrating a method of manufacturing a fuel cell anode in accordance with an embodiment of the present invention. An anode manufactured by the fuel cell anode manufacturing method in accordance with the present invention may be applied to a polymer electrolyte fuel cell. That is, the anode may be disposed at one side of a polymer electrolyte so as to form a Membrane Electrode Assembly (MEA) in cooperation with a cathode.

Referring to FIG. 1, the method of manufacturing the fuel cell anode in accordance with an embodiment of the present invention generally includes the steps of synthesizing a fuel cell catalyst (S10), forming a fuel cell electrode (S20) and finally forming an electrolysis catalyst (S30).

In the synthesizing of the fuel cell catalyst at S10, the fuel cell catalyst serves to oxidize a fuel for the anode in an electrochemical manner. The fuel cell catalyst may be selected from any conventional fuel cell catalysts. Examples of fuel cell catalysts suitable for use in the present invention include, but are not limited to, noble metals, transition metals, oxides of noble metals and transition metals, alloys of noble metals and transition metals, and mixtures of noble metals and transition metals and their oxides and alloys. In an exemplary embodiment, the fuel cell catalyst may be composed of having platinum nanoparticles supported on a porous carbon material.

In the forming of the fuel cell electrode at S20, the fuel cell catalyst may be provided in the form of a film-shaped porous electrode while being mixed with electrode additives. For example, the fuel cell catalyst may be provided and mixed with electrode additives such as solvents, binders (ionomer), and carbon fibers that form a porous structure of the electrode.

In the forming of the electrolysis catalyst at S30, the electrolysis catalyst is synthesized on the fuel cell electrode which has been formed at S20. According to various embodiments, the electrolysis catalyst is formed through an Atomic Layer Deposition (ALD) technique. According to the embodiment shown in FIG. 1, the electrolysis catalyst is synthesized on the fuel cell electrode at the same time of the loading of the electrolysis catalyst. In other words, as the electrolysis catalyst is synthesized on the fuel cell electrode as it is loaded into the anode.

The electrolysis catalyst may comprise any conventional electrolysis catalysts. Examples of electrolysis catalysts suitable for use in the present invention include, but are not limited to, noble metal oxides, mixtures of noble metal oxides, solid solutions of noble metal oxides, mixtures of noble metal oxides and valve metal oxides, solid solutions of noble metal oxides and valve metal oxides, and combinations thereof.

According to preferred embodiments, the metal oxide forming the electrolysis catalyst comprises noble metal oxides selected from the group consisting of ruthenium oxide ($RuO_x$), iridium oxide ($IrO_x$), and a solid solution of ruthenium oxide ($RuO_x$) and iridium oxide ($IrO_x$). For example, when x is 2, the metal oxide may comprise noble metal oxide selected from the group consisting of ruthenium oxide ($RuO_2$), iridium oxide ($IrO_2$), and a solid solution of ruthenium oxide ($RuO_2$) and iridium oxide ($IrO_2$).

According to exemplary embodiments, the metal oxide forming the electrolysis catalyst comprises a metal oxide selected from the group consisting of a solid solution of ruthenium oxide ($RuO_x$) and a valve metal oxide, and a solid solution of iridium oxide ($IrO_x$) and a valve metal oxide. For example, the metal oxide may comprise a solid solution of ruthenium oxide ($RuO_2$) and titanium oxide ($TiO_2$).

According to the method of manufacturing the fuel cell anode in accordance with embodiments of the present invention, the introduction of the electrolysis catalyst is achieved on the fuel cell electrode that is already formed, thereby minimizing the deformation of the structure of the electrode. As a result, an electrode having improved performance is obtained.

The forming of the electrolysis catalyst at S30 may be achieved through various known techniques. According to an embodiment of the present invention, an Atomic Layer Deposition (ALD) technique is used to form an electrolysis catalyst comprising $RuO_x$ and $IrO_x$, as shown in FIG. 5.

Figure 2:
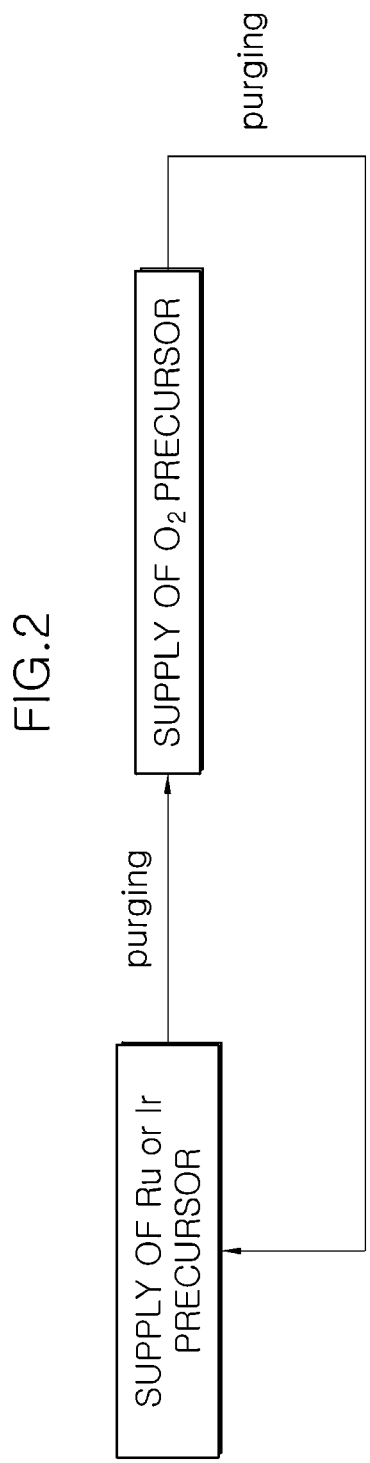
FIG. 2 is a block diagram illustrating an Atomic Layer Deposition (ALD) technique in accordance with an embodiment of the present invention.

In particular, according to the ALD technique shown in FIG. 2, a precursor containing target material for deposition, such as ruthenium (Ru) or iridium (Ir), is converted into a gaseous state so as to react with the fuel cell anode that has already been formed. Then, purging is performed using inert gas to remove residue. Finally, an oxygen supply material (oxygen or vapor) is supplied to oxidize the ruthenium (Ru) or iridium (Ir). The above process is repeated, to thereby synthesize the electrolysis catalyst on the anode, which can be accomplished at the same time of loading the electrolysis catalyst.

Figure 3:
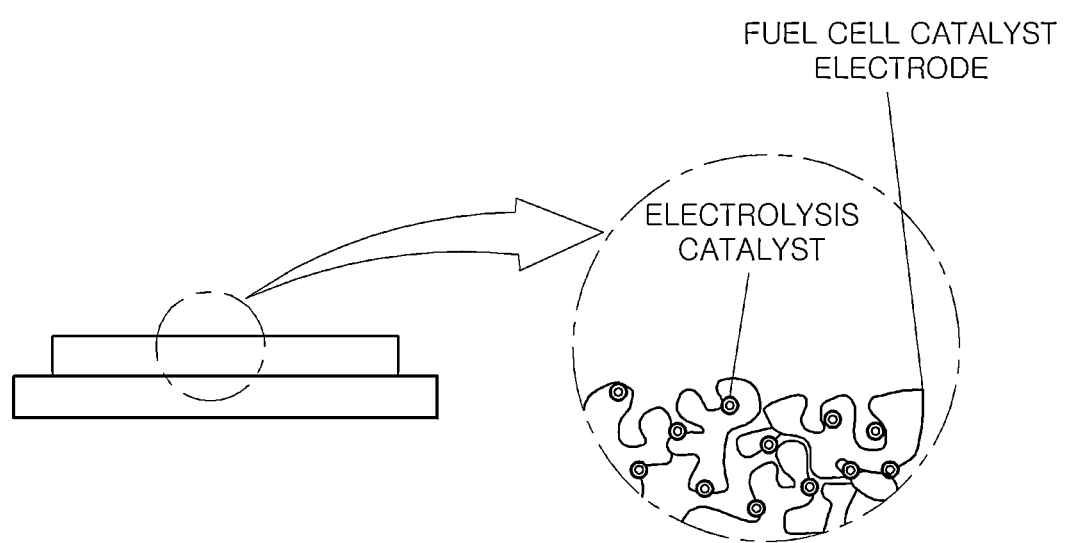
FIG. 3 is a schematic diagram illustrating a shape of the structure of a fuel cell anode manufactured by the fuel cell anode manufacturing method in accordance with an embodiment of the present invention.

According to the above described ALD technology, the electrolysis catalyst can be deposited at an atomic scale on the fuel cell anode, for example, as shown in FIG. 3.

Figure 4:
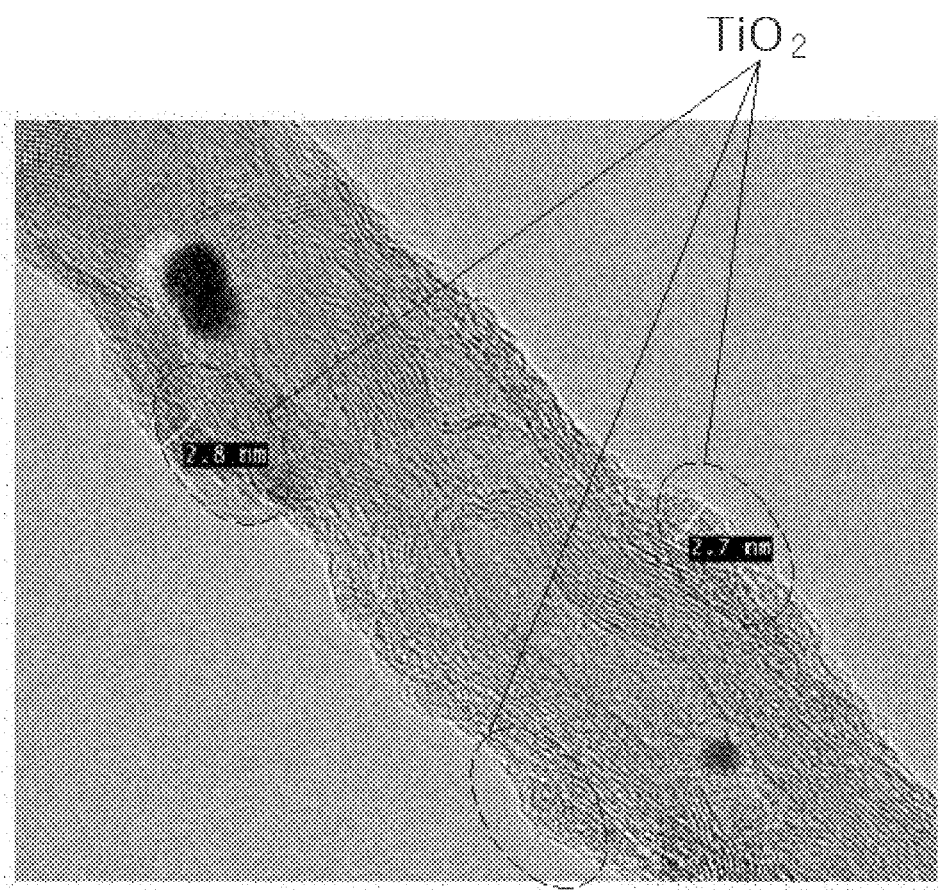
FIG. 4 is a transmission electron microscope (TEM) image showing the fuel cell anode manufactured by the fuel cell anode manufacturing method in accordance with an embodiment of the present invention.

Meanwhile, as shown in FIG. 4, titanium oxide ($TiO_2$), which may serve as an element of the water electrolysis catalyst, can be loaded on the anode in the form of particles.

In accordance with the present invention, the performance of the electrode can be improved by introducing the electrolysis catalyst on the already formed fuel cell electrode, so that deformation of the electrode structure is minimized In addition, the manufacturing time can be reduced, when compared to the conventional fuel cell anode manufacturing process, by synthesizing the electrolysis catalyst using a suitable deposition process, such as the ALD technique, while loading the electrolysis catalyst.

While the present invention has been described with respect to specific embodiments thereof, it will be apparent to those skilled in the art that various changes and modifications may be made without departing from the spirit and scope of the invention as defined in the following claims.

What is claimed is:

1. A method of manufacturing an anode for a fuel cell, the method comprising:
   synthesizing a fuel cell catalyst for an anode using an electrochemical technique;
   forming an electrode for the anode using the synthesized fuel cell catalyst; and
   synthesizing an electrolysis catalyst in the form of particles, which is used to electrolyze water, on the electrode while simultaneously loading the electrolysis catalyst on the anode;
   wherein the electrolysis catalyst is selected from the group consisting of ruthenium oxide, iridium oxide, and solid solutions of ruthenium oxide and iridium oxide; and,
   the synthesizing of the electrolysis catalyst is performed through Atomic Layer Deposition.

2. The method of claim 1, wherein the fuel cell is a polymer electrolyte fuel cell.

3. The method of claim 1, wherein the fuel cell catalyst is selected from the group consisting of noble metals, transition metals, oxides of noble metals and transition metals, alloys of noble metals and transition metals, and mixtures thereof.

4. The method of claim 1, wherein the electrolysis catalyst is selected from the group consisting of noble metal oxides, mixtures of noble metal oxides, solid solutions of noble metal oxides, mixtures of noble metal oxides and valve metal oxides, solid solutions of noble metal oxides and valve metal oxides, and combinations thereof.

\* \* \* \* \*